United States Patent [19]

Komancheck et al.

[11] 4,003,384
[45] Jan. 18, 1977

[54] GRAIN DISTRIBUTION MEANS FOR ROTARY COMBINE

[75] Inventors: John J. Komancheck, New Holland; Robert R. Todd, Leola, both of Pa.

[73] Assignee: Sperry Rand Corporation, New Holland, Pa.

[22] Filed: Mar. 29, 1976

[21] Appl. No.: 671,648

[52] U.S. Cl. .............................. 130/27 T; 56/14.6
[51] Int. Cl.² .......................................... A01F 7/00
[58] Field of Search .................. 56/209, 14.3, 14.4, 56/14.5, 14.6; 130/27 R, 27 T, 27 P, 27 Q, 27 S, 24, 27 AE

[56] References Cited

UNITED STATES PATENTS

| | | | |
|---|---|---|---|
| 3,626,472 | 12/1971 | Rowland-Hill | 130/27 T |
| 3,742,686 | 7/1973 | Rowland-Hill | 130/27 T |

*Primary Examiner*—Russell R. Kinsey
*Attorney, Agent, or Firm*—C. Hercus Just; Frank A. Seemar; John R. Flanagan

[57] ABSTRACT

A mobile combine having longitudinally extending rotor and concave threshing members and a reciprocating grain pan beneath said concave to receive threshed and partially threshed crop products for passage to sieve mechanism, and angular deflector members fixed to and reciprocable with said grain pan and extending longitudinally therewith, said members extending downward and inward from opposite sides of the chamber below said concave and above said grain pan to deflect grain falling from said concave and direct it toward the center of said grain pan to prevent crop material from gravitating more to one side of said grain pan than the other such as during hillside harvesting operations.

12 Claims, 4 Drawing Figures

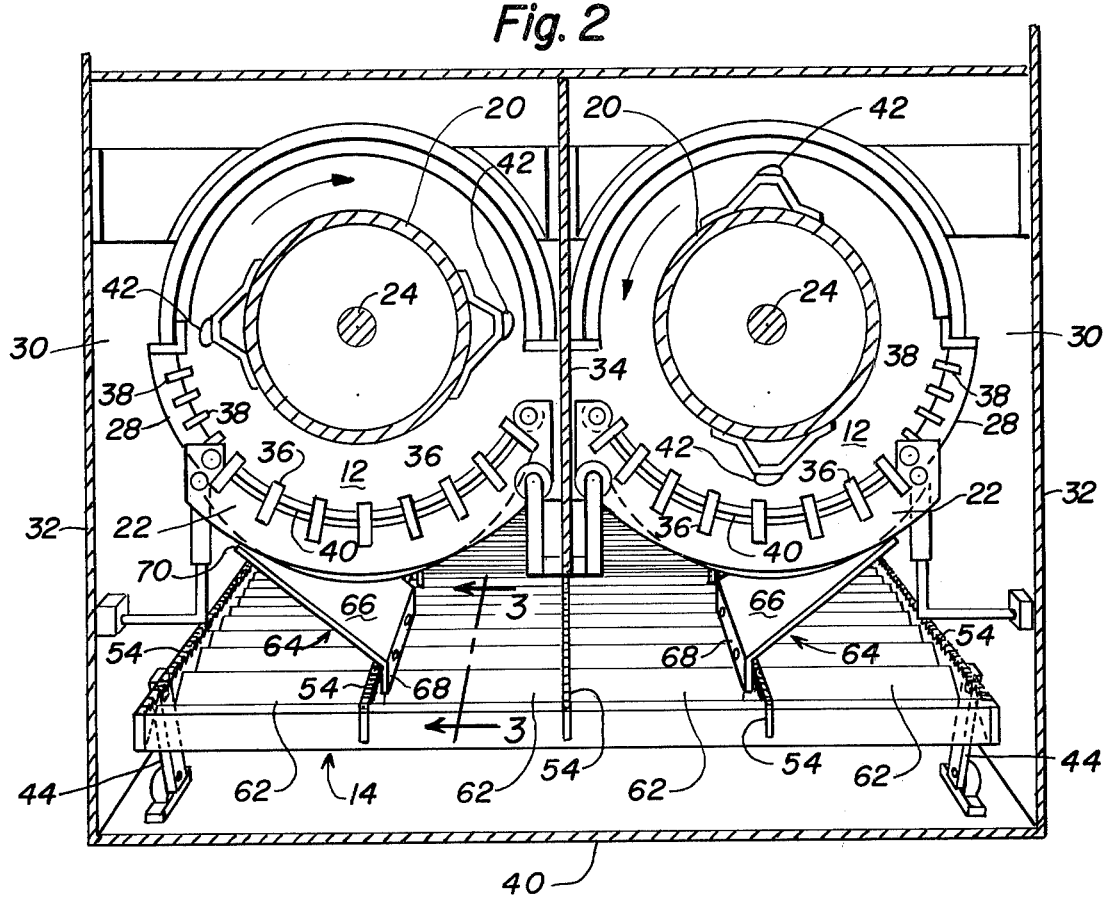
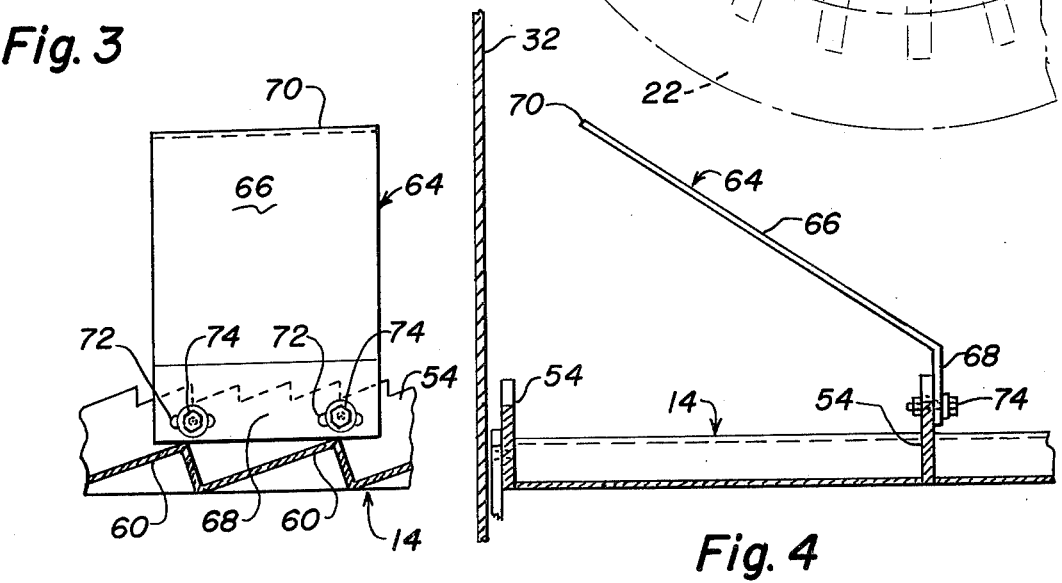

GRAIN DISTRIBUTION MEANS FOR ROTARY COMBINE

BACKGROUND OF THE INVENTION

This invention pertains to a mobile combine of the axial flow type in which, in the preferred construction, a pair of threshing compartments extend longitudinally within said combine, in side-by-side relationship, said threshing compartments comprising rotors having rasp bars thereon which coact with concaves which are complementary to the lower half of the paths described by the said rasp bars when rotating to effect threshing of crop material therebetween. The threshed and partially threshed crop material passes through grid-like openings in the concave and fall onto a grain pan which is transversely co-extensive with the chamber immediately below the concaves, said grain pan extending from the inlet end of the threshing compartments toward the other end thereof for at least part of the length of said threshing compartments.

In particular, the present invention pertains to a combine of the type referred to above in which the grain pan is mounted for fore-and-aft reciprocation longitudinally of the axis of the combine and discharges crop material from the rearward end of the grain pan onto similarly reciprocating sieve means which operates to separate desired crop material from chaff and other similar waste material. A typical combine of the type to which the present invention pertains is illustrated in prior U.S. Pat. No. 3,626,472, in the name of Edward William Rowland-Hill, dated Dec. 7, 1971. In said patent, the grain pan and sieve mechanism are mounted for longitudinal, fore-and-aft reciprocation.

It has been found in operation of a combine of this type on hillsides, there is a distinct tendency for uneven distribution of threshed crop material upon the grain pan, such as a greater quantity thereof accumulating on the downhill side of the grain pan, which results in less efficiency due to loss of capacity and grain loss. In addition, combines of this type normally employ a principal or main concave immediately below each rotor and a concave extension which extends radially farther around the path described by the rasp bars of the rotor respectively toward opposite sides of the interior compartment of the combine in which the threshing compartments are located. Due to the fact that the rotors of the threshing compartments respectively rotate in opposite rotary direction and, as viewed from the forward end of the combine, the left hand rotor rotates clockwise and the right hand rotor rotates counterclockwise, said rotors respectively tend to carry the crop material up the outer side portions of the threshing compartments and discharge the grain through said concave extensions, which results in a heavier accumulation of grain occurring respectively along the outer sides of the grain pan than centrally thereof.

In view of the foregoing, the present invention has been devised to provide a more even distribution of grain upon the grain pan, regardless of whether the combine is operating on substantially level terrain, or on a hillside, and this is accomplished by mechanism described in detail below.

SUMMARY OF THE INVENTION

It is a primary object of the invention to provide deflector means carried by the reciprocating grain pan of the combine and comprising a pair of members respectively fixed to the grain pan and extending downward and inward from a location above the grain pan toward the central portion of said grain pan, said deflector members extending at an acute angle in opposite directions with respect to the grain pan, said angle being sufficient that even when the combine is operating on a hillside of reasonably extensive slope, grain falling onto the deflector members from the concave or concave extension will not accumulate thereon but will at least gradually, if not more rapidly, move by gravity, assisted by the reciprocating motion of the grain pan, toward the central portion of the grain pan.

It is another object of the invention to employ said deflector members on a grain pan having a plurality of vertical divider strips extending longitudinally between opposite ends of the grain pan and said divider strips being spaced transversely apart so as to provide a plurality of similar channels extending along the grain pan from the forward to the rearward end thereof. These channels operate to further minimize the tendency for grain or other similar threshed cropped material received by said grain pan from accumulating more toward one side of the pan than the other, especially when operating on a hillside and the lower, inner ends of said deflector members being connected to similar divider strips of said grain pan respectively spaced apart from the central longitudinal axis of the grain pan.

It is a further object of the invention to form said angular deflector members by providing a limited number of sections of said deflector members which have flanges on the lower, inner edges thereof which are parallel to the vertical divider strips in the grain pan, said connection being in the form of slots which receive bolts and permit limited longitudinal adjustment of said deflector sections in a longitudinal direction with respect to each other and the divider strip, the number of said sections for each deflector means also being adjustable in accordance with the type and quantity of threshed material being produced by the combine, thereby affording a somewhat universal adaptation of the operation of the combine to a range of different types and kinds of crop material.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 2 is a fragmentary vertical section showing the inlet end of the threshing compartment of the combine and illustrating in perspective the forward end and upper surface of the grain pan which supports the deflector means comprising one of the primary features of the present invention.

FIG. 3 is a fragmentary side elevation, partly in vertical section, showing the mounting means for one of the deflector sections as seen generally on the line 3—3 of FIG. 2.

FIG. 4 is a fragmentary end view, partly in vertical section, of the elements illustrated in FIG. 3 as seen on the line 4—4 thereof.

DETAILED DESCRIPTION

Figure 1:
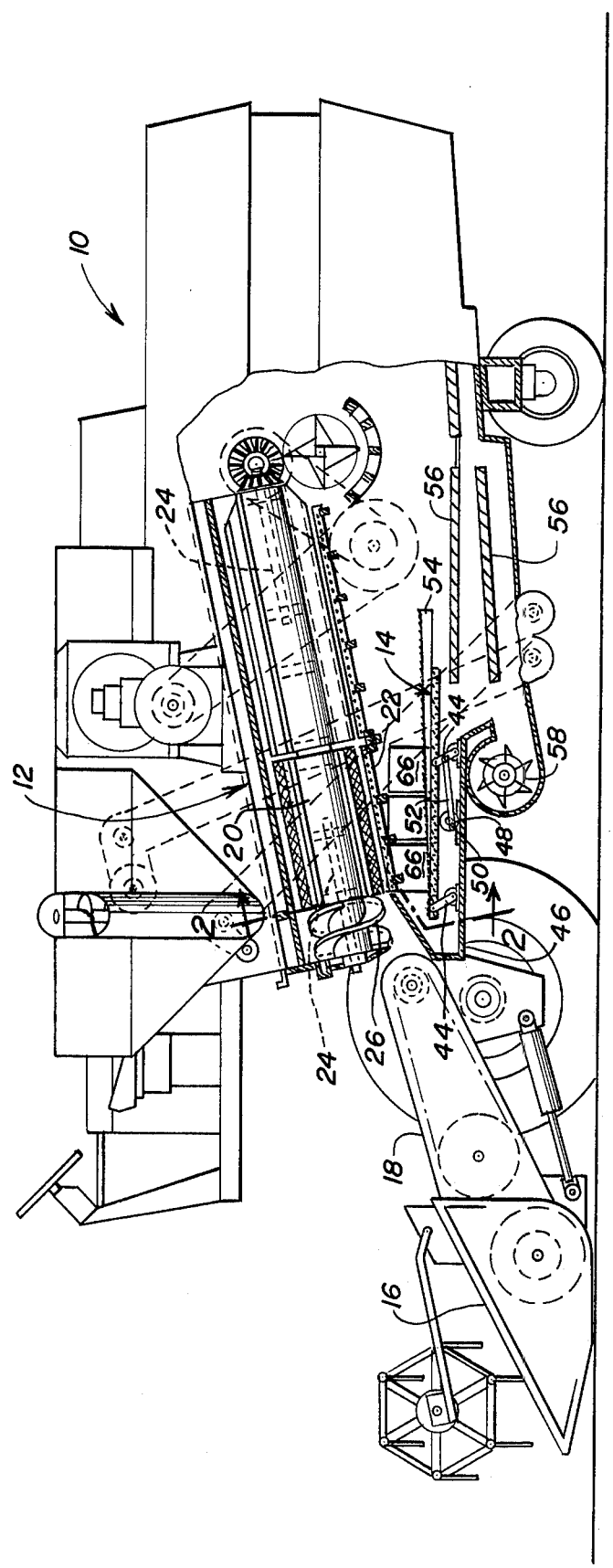
FIG. 1 is a side elevation of an exemplary combine of the type to which the present invention pertains, part of the sidewalls of said combine being broken away to show interior details thereof and certain of the elements being shown in vertical section.

Referring to FIG. 1, a mobile combine 10 of the axial flow type is illustrated in side elevation and part of the sidewall thereof is broken away to illustrate in particular the threshing compartment 12, the grain pan 14 and the means to support and oscillate the same, all of which encompass the primary feature of the present invention. To afford a comprehension of other portions of the combine which function to effect cutting, feeding and threshing of various types of crop material which ultimately is deposited on the grain pan upon which the primary feature of the invention is mounted, the following description is included.

Mounted on the forward end of the combine 10 is a header 16 which cuts and feeds crop material to a conventional elevator 18 which moves the cut and consolidated material upwardly to the forward end of the threshing compartment 12 which primarily includes a pair of rotors 20 and complementary, coacting concaves 22. The rotors 20 are each supported upon longitudinally extending shafts 24 which are mounted in suitable bearings at opposite ends of the threshing compartment 12 and mounted on the forward end of shaft 24, forwardly of the rotors 20, are a pair of augers 26, see FIG. 1, only one of said augers being illustrated in said figure, it being understood that the other one is directly behind the one which is shown. Said augers as well as the rotors 20 rotate in opposite directions as indicated by the arrows shown in FIG. 2, said view being taken from the forward end of the combine and, as viewed, it will be seen that the left hand rotor 20 rotates clockwise, while the right hand rotor operates counterclockwise and the augers 26 correspondingly rotate in similar opposite directions for purposes of feeding the material moved upwardly by the elevator 18 to the inlet end of the threshing compartment 12.

In FIG. 2, it also will be seen that in addition to the principal or main concaves 22 which are directly below the lower portions of the main rotors 20, each of said threshing compartments also include concave extensions 28, whereby due to the fact that the rotors are rotating in the direction of the arrows illustrated in FIG. 2, it will be seen that in addition to grain and other threshed products discharging downward from the principal concaves 22, additional threshed material is discharged through the concave extensions 28, which results in the discharge of threshed material adjacent the opposite sides of the compartment 30 which extends from the side plates 32 of the combine toward the central dividing plate 34 between the threshing compartments 12. The threshed material which passes through the concave extensions 28 therefore fall onto the grain pan 14 along the opposite sides thereof but nevertheless is caught by the grain pan due to the fact that said grain pan extends transversely across the compartment 30 between the opposite side plates 32 of the housing of the combine.

The principal concaves 22 as well as the concave extensions 28 comprise a plurality of transversely spaced bars 36 and 38, between which a series of longitudinally spaced arcuate wires 40 extend and thereby form a grid pattern of openings through which the threshed or partially threshed crop material passes as the same is produced by co-action of the rasp bars 42 with the bars 36 and 38 of the concaves 22 and 28.

As referred above, the threshed and partially threshed material which is discharged from the concaves 22 and 28 falls onto the grain pan 14 which is mounted for fore-and-aft reciprocation. As shown in FIGS. 1 and 2, it will be seen that pairs of pivotally supported legs 44 extend upward from a supporting plate 46 which extends between the opposite side plates 32 of the combine. Said plates also support a transverse crank shaft 48, on opposite ends of which a short crank 50 is mounted for operation of a pair of pitmans 52 respectively disposed adjacent opposite sides of the plate 46, said pitmans also being connected to the rearward legs 44 which support the grain pan 14. The crank shaft 48 is operated by a suitable belt or sprocket chain, not shown, which is connected to and driven by a shaft selected from the many other shafts of the combine in accordance with customary procedure in combines employing reciprocating grain pans such as that illustrated in said aforementioned U.S. Pat. No. 3,626,472.

From FIG. 2, it will be seen that the grain pan 14 is composed of a plurality of longitudinal divider strips or plates 54, one of these respectively being along opposite sides of the grain pan 14, one being in the center, and an additional pair thereof being mounted intermediately between the side strips 54 and the central strip 54 as clearly shown in FIG. 2. The upper edges of the strips are serrated in a manner that reciprocation of the grain pan in a fore-and-aft direction longitudinally of the combine effects progressive feeding of material falling onto the grain pan, such as chaff and partially threshed material, from the forward end of the grain pan toward the rearward end thereof, where as shown in FIG. 1, the threshed and waste material is deposited onto the sieve means 56 which, also, preferably is mounted for fore-and-aft reciprocation by conventional means.

The bottom of the grain pan 14 also is arranged with a series of stepped sections 60 which also produce a progressive rearward feeding of the threshed material deposited thereon due to the fore-and-aft reciprocation of the grain pan. It also will be seen especially from FIG. 2 that the transversely spaced plurality of divider strips 54 forms a series of parallel, shallow channels 62 along which the threshed material is progressively fed from the forward to the rearward end, as described above and these channels, in conjunction with the central and intermediate divider strips 54 in particular tend to maintain the threshed material in a substantially evenly spread manner across the grain pan between the opposite sides thereof so that operation of the grain pan is efficient, especially when the combine is moving over relatively level terrain. When such combine is moving on a hillside, however, and especially one that is substantially sloped, there is a tendency for threshed material to accumulate more heavily along the downhill side of the grain pan 40 than along the uphill side. To obviate such occurrence to any appreciable extent, the present invention provides deflector means 64 which preferably comprise a series of plate sections 66 each of which have a flange 68 along the lower, inner edge thereof, said flanges being parallel to the divider strips 54 and the plate sections 66 extend at an acute angle to the plate of the grain pan 14 and the upper edges 70 of said plate sections 68 terminating in spaced relationship to the side plates 32 of the combine, as can best be seen in FIG. 4, in order that the material discharging through the concave extensions 28 may fall into the channels 62 between the outermost side divider strips 54 and the intermediate divider strips 54. The plate sections 66 primarily function to deflect a substantial part of the threshed material falling through the openings of the principal concaves 22 into the shallow channels 62 which are between the intermediate divider strips 54 and the central divider strips 54, thereby operating to more evenly distribute the threshed material onto the grain pan either when the combine is operating on level terrain or on a hillside.

The acute angle at which the plate sections 66 are disposed with respect to the plane of the grain pan is selected so that even when the combine is operating upon a hillside having an appreciable slope, the so called downhill deflector means 64 will not be horizontal so as to tend to have threshed material to accumulate thereon but, instead, will still slope downwardly and inwardly toward the centermost shallow channel 62 and thus insure such relatively even deposit of threshed material into the various channel 63 of the grain pan.

From FIGS. 3 and 4, it will be seen that the flange 68 of each of the sections 66 are provided with a plurality of longitudinally spaced slots 72 through which bolts 74 extend, said bolts also extending through appropriately aligned holes in the intermediate divider strips 54, such arrangement permitting a limited adjustment of the plate sections 66 in a longitudinal direction with respect to the divider strips 54 to permit maximum efficiency in the function of such sloping plate section 66 with respect to different types and sizes of kernels, grain, and seed which are capable of being harvested by a more or less universal type combine to which the present invention pertains. In addition, from FIG. 1 in particular, it will be seen that only a limited number of the plate sections 66 are provided along the grain pan 14, these sections extending from the forward end of the grain pan toward the opposite end thereof but not necessarily extending fully to the rearward end thereof. Further, due to the fact that the sections 66 are readily connectable to and detachable from the grain pan, it is possible to utilize only a certain number of the plate sections 66 in connection with the harvesting of a particular type of product, depending upon the nature thereof, for purposes of achieving maximum efficiency in the disposition of the threshed material upon the grain pan 14, as contemplated by the present invention.

In view of the foregoing, it will be seen that the present invention provides deflecting means connectable to and carried by the grain pan for reciprocation therewith in fore-and-aft directions longitudinally of the combine for purposes of providing maximum efficiency in affording relatively even distribution of threshed crop products upon the grain pan between opposite sides thereof, having regard for the discharge of threshed material through the concave extensions 28, either when the combine is operating on relatively level terrain or on a hillside and said deflector means also function to distribute a substantial amount of the threshed material discharged through the principle concaves 22 for deposit thereof in the channels 62 defined by the intermediate divider strips 54 and the central strip 54. The various types of adjustments which are possible both in regard to spacing and numbers of plate sections 66 which are connected to the divider strips 54 also contributes to the maximum efficiency of the operation of the combine, particularly in regard to endeavoring to effect maximum even distribution of the threshed material upon the grain pan between opposite edges thereof.

The foregoing description illustrates preferred embodiments of this invention. However, the concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A mobile combine having threshing means carried thereby and comprising rotor and cooperating concave means, means on the forward end of the combine operable to feed material to said threshing means, a grain pan supported upon said combine below said threshing means to receive threshed crop material from said threshing means, sieve means supported within said combine rearwardly of said grain pan to receive threshed crop material from said grain pan and operable to separate desired crop material from chaff and other waste material, movable means in said combine supporting said grain pan and sieve means for fore-and-aft reciprocation within said combine to effect such separation, and power means operable to actuate said threshing means and reciprocate said grain pan and sieve means as aforesaid; the improvement comprising at least one angularly disposed deflector member fixed to said grain pan and reciprocable therewith, said deflector member respectively extending downward and inward toward said grain pan from the side edge thereof below said concave means and operable to deflect crop material discharged from said concave toward the center of said grain pan and thereby minimize tendencies for crop material to gravitate to the side of the grain pan.

2. The combine according to claim 1 in which said grain pan is provided with a plurality of divider members extending vertically and longitudinally with respect to said grain pan, said divider members being spaced at transverse intervals across said grain pan and operable to maintain distribution of crop material upon the grain pan in a substantially even manner between the opposite side edges thereof.

3. The combine according to claim 1 in which more than one deflector members are provided at least one of which extends downward from each of the opposite side edges of said grain pan to minimum tendencies for crop material to gravitate more to one side of the grain pan than the other such as during hillside harvesting operations.

4. The combine according to claim 3 in which said grain pan is provided with a plurality of divider members extending vertically and longitudinally with respect to said grain pan, said divider members being spaced at transverse intervals across said grain pan and operable to maintain distribution of crop material upon the grain pan in a substantially even manner between the opposite side edges thereof.

5. The combine according to claim 4 in which said deflector members carried by said grain pan respectively extend at similar acute angles to said grain pan and the lower edges of said deflector members being connected to similar divider members of said grain pan for support thereby and reciprocable movement therewith.

6. The combine according to claim 5 in which the lower edges of said deflector members have flanges thereon parallel to said divider members and said flanges being secured to said similar divider members by bolts which extend commonly through said flanges and divider members to connect said flanges to said divider members.

7. The combine according to claim 5 in which said grain pan extends substantially horizontally and transversely co-extensive with the opposite sides of said threshing means and the outer upper edges of said deflector members extending outward in opposite directions but being spaced a limited distance from a vertical projection from the sides of said grain pan.

8. The combine according to claim 7 in which said threshing means comprise a pair of similar rotors and each rotor having a concave below the lower portion of said rotors, and said grain pan extending transversely in vertical alignment with the outer side edges of said concaves.

9. The combine according to claim 3 in which said deflector members comprise sections arranged in longitudinal alignment with each other and extend along said grain pan from the forward end thereof adjacent the forward end of said threshing means toward the opposite end of said concave, and means detachably connecting said sections of deflector members to said grain pan for support thereby of a selected number of said sections in accordance with the type of crop material being harvested.

10. The combine according to claim 9 in which a plurality of divider members extend longitudinally of said grain pan and are fixed thereto, said divider members being spaced transversely across said grain pan between the opposite side edges thereof, and flanges being provided on the lower ends of said deflector sections connected to similar divider members spaced transversely on opposite sides of the central longitudinal axis of said grain pan.

11. The combine according to claim 10 in which a plurality of longitudinally extending slots limited length are formed in said flanges of said deflector sections, and bolts extending commonly through holes in said divider members and said slots in said flanges on said deflector sections to afford limited longitudinal adjustment of said sections with respect to said grain pan.

12. The combine according to claim 10 in which said divider members on said grain pan are arranged with one pair respectively adjacent opposite side edges of said grain pan and one divider member being connected to said grain pan centrally thereof, and a plurality of additional divider members being fixed to said grain pan respectively intermediately between said divider members adjacent opposite side edges of said grain pan and said central divider member, and the flanges of said deflector sections being connected to said intermediate divider members and extending upward and outwardly respectively in opposite directions from said divider members.

* * * * *